United States Patent [19]

White

[11] 4,258,877

[45] Mar. 31, 1981

[54] DAMPER BLADE CONTROL

[75] Inventor: Thomas M. White, Liverpool, N.Y.

[73] Assignee: Carrier Corporation, Syracuse, N.Y.

[21] Appl. No.: 71,321

[22] Filed: Aug. 30, 1979

[51] Int. Cl.³ ............................................. F24F 7/06
[52] U.S. Cl. ................................... 236/49; 248/300; 318/467
[58] Field of Search ........................ 236/49; 251/134; 318/467; 248/300

[56] References Cited

U.S. PATENT DOCUMENTS

| | | | |
|---|---|---|---|
| 1,700,120 | 1/1929 | Campbell | 248/300 X |
| 2,499,544 | 3/1950 | Vancil | 236/49 X |
| 3,412,232 | 11/1968 | Sanders | 236/49 X |
| 3,818,302 | 6/1974 | Rutledge | 318/467 X |
| 3,914,676 | 10/1975 | Madonian et al. | 251/134 X |
| 4,147,298 | 4/1979 | Leemhuis | 236/49 |

OTHER PUBLICATIONS

Operating and Maintenance Instructions 35 B, "Modubox Variable Air Volume Systems", Form 35B-1S0, 1978, Carrier Corp.
Carrier Corp.—Installation and Startup Instructions, 35 B, "System Powered Unit and Remote Diffuser Boxes", Form 35B-551, 1978.
Trane Co.—"Varitrane Controls", Form D VAV-1 776, 1977.

Primary Examiner—William E. Tapolcai, Jr.
Attorney, Agent, or Firm—J. Raymond Curtin; John S. Sensny

[57] ABSTRACT

A damper blade control for regularing the flow of conditioned air through a supply air duct and into a zone. The control comprises an electric motor for use with a source of electrical energy for moving the damper blade between a minimum air flow position and a maximum air flow position, and a thermostatic switch electrically positioned between the motor and the source of electrical energy for connecting the motor thereto to change the position of the damper blade in response to changes in the temperature of the zone. The control further comprises maximum and minimum flow switches disposed outside the supply air duct for disconnecting the motor from the source of electrical energy when the damper blade reaches, respectively, the maximum and minimum air flow positions. An indicator lever is located outside the supply air duct and supported thereby for movement in response to movement of the damper blade for indicating the position thereof, and the indicator lever actuates the maximum and minimum flow switches to disconnect the motor from the source of electrical energy when the damper blade reaches, respectively, the maximum and minimum air flow positions. Adjustable securing brackets are provided to adjustably secure the maximum and minimum flow switches to the supply air duct, the position of the maximum and minimum flow switches being adjustable to vary the maximum and minimum air flow positions of the damper blade.

5 Claims, 5 Drawing Figures

DAMPER BLADE CONTROL

BACKGROUND OF THE INVENTION

This invention relates generally to a ventilation system having a damper blade rotatably mounted within a supply air duct provided to deliver conditioned air to an enclosure, and more particularly to a control for such a damper blade.

Many multi-room structures, for example office buildings and schools, constructed during the past several years include air conditioning systems which deliver either relatively warm or cool, conditioned air from a central source thereof to each of the enclosures or rooms in the building. Typically, one or more supply air ducts are employed to transmit or conduct the conditioned air to each enclosure. Often, each supply air duct includes a damper assembly or similar mechanism having a movable damper blade to regulate the flow of air through the supply air duct. Movement of the damper blade may be responsive to changes in the pressure of the air passing through the supply air duct and/or changes in the temperature of the enclosure served thereby.

It is frequently desirable to constantly deliver at least a minimum amount of air to an enclosure regardless of the temperature thereof to insure a continuous circulation of air through the enclosure. A continuous, even though minimal, flow of air may prevent, for example, the accumulation of smoke or odors or the development of localized areas of stagnated air in the enclosure. Also, it is often advantageous to limit the maximum air flow into a room to prevent or minimize, as examples, undesirable noise, drafts, or localized cool areas within the room. Moreover, due to a number of reasons such as size, location, and use, different rooms often have different preferred maximum and minimum air circulation rates. For these reasons, damper assemblies commonly have controls to maintain the damper blade of the assembly between adjustable minimum and maximum air flow positions, independent of the thermostatic and pressure controls for the blade. The minimum and maximum positions of a particular damper blade are adjusted to fit the needs of the specific enclosure or room with which the damper blade is eventually associated. Recently, attention has been directed toward employing an electric motor to move a damper blade of a damper assembly between minimum and maximum air flow positions. Prior art arrangements for moving a damper blade by means of an electric motor have been somewhat inefficient or expensive, however, often, for example, supplying current to the motor even though the damper blade is at a maximum position and the motor is stalled.

SUMMARY OF THE INVENTION

In view of the above, an object of this invention is to provide a unique control for a damper blade of a supply air duct.

Another object of the present invention is to move a damper blade by means of an electric motor and to control the motor in a very inexpensive, reliable, and adjustable manner.

A further object of this invention is to employ an electric motor to move a damper blade between minimum and maximum air flow positions, and to actuate limit switches by means which also indicate the position of the damper blade to disconnect the motor from a source of electrical energy when the damper blade reaches the minimum or maximum air flow positions.

Still another object of the present invention is to move a damper blade between easily adjustable minimum and maximum air flow positions by means of an electric motor, where the motor is disconnected from a source of electrical energy when the damper blade reaches the minimum or maximum air flow positions.

Another object of this invention is to connect an electric heater to a source of electrical energy to heat air passing through a supply air duct when a damper blade therein reaches a minimum flow position.

These and other objectives are attained with a novel damper blade control for regulating the flow of conditioned air through a supply air duct and into a zone. The control comprises electric motor means for use with a source of electrical energy for moving the damper blade between a minimum air flow position and a maximum air flow position, and thermostatic switch means electrically positioned between the motor means and the source of electrical energy for connecting the motor means thereto to change the position of the damper blade in response to changes in the temperature of the zone. The control further comprises maximum and minimum flow switch means disposed outside the supply air duct for disconnecting the motor means from the source of electrical energy when the damper blade reaches, respectively, maximum and minimum air flow positions. Indicator means is located outside the supply air duct and supported thereby for movement in response to movement of the damper blade for indicating the position thereof, and the indicator means actuates the maximum and minimum flow switch means to disconnect the motor means from the source of electrical energy when the damper blade reaches, respectively, the maximum and minimum air flow positions. Adjustable securing means is also provided to adjustably secure the maximum and minimum flow switch means to the supply air duct, the position of the maximum and minimum flow switch means being adjustable to vary the maximum and minimum air flow positions of the damper blade.

A DETAILED DESCRIPTION OF THE PREFERRED EMBODIMENT

Figure 1:
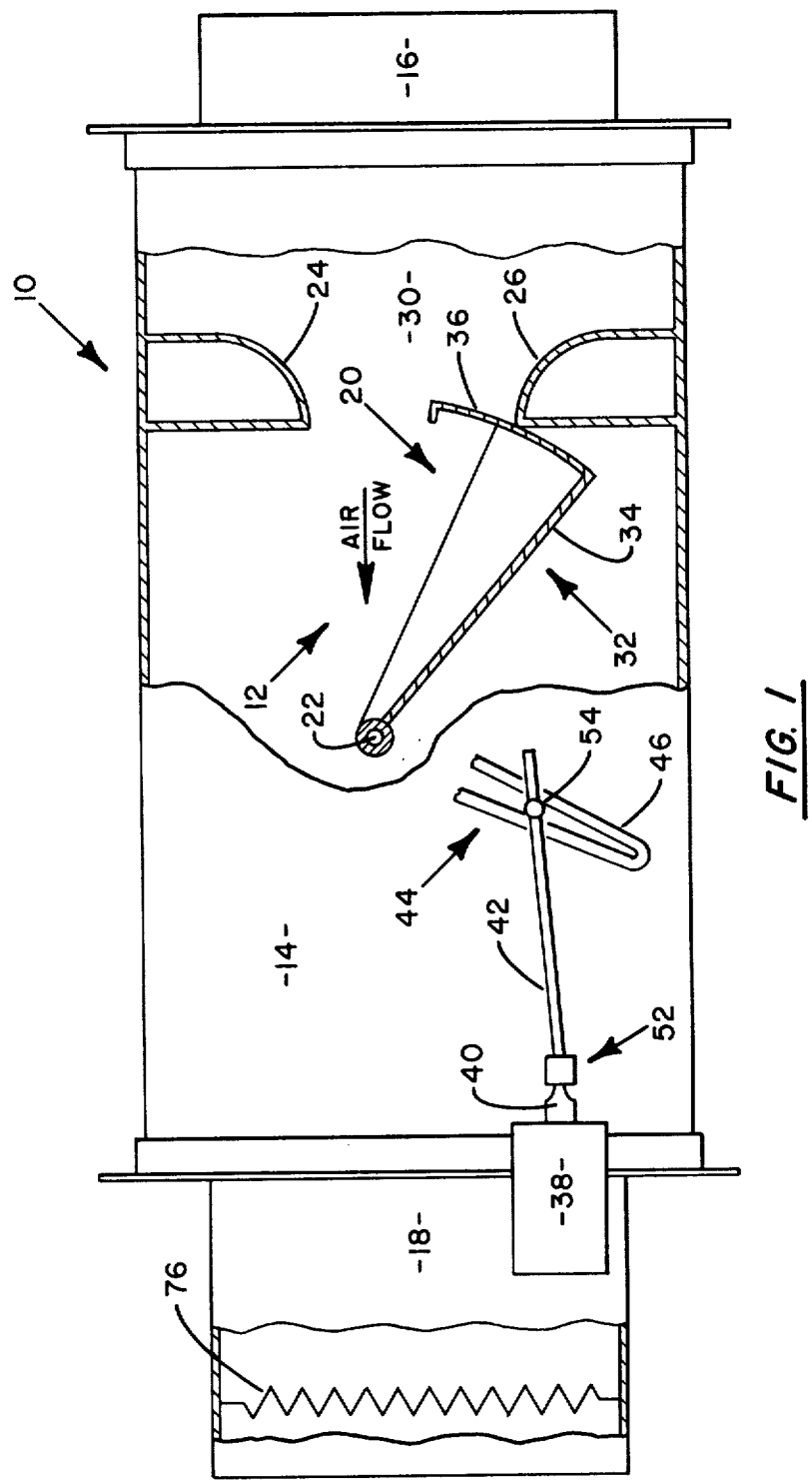
FIG. 1 shows the interior of a supply air duct having a rotatable damper blade mounted therein.

Referring to FIG. 1, there is disclosed portions of supply air duct 10 including damper assembly 12.

Figure 2:
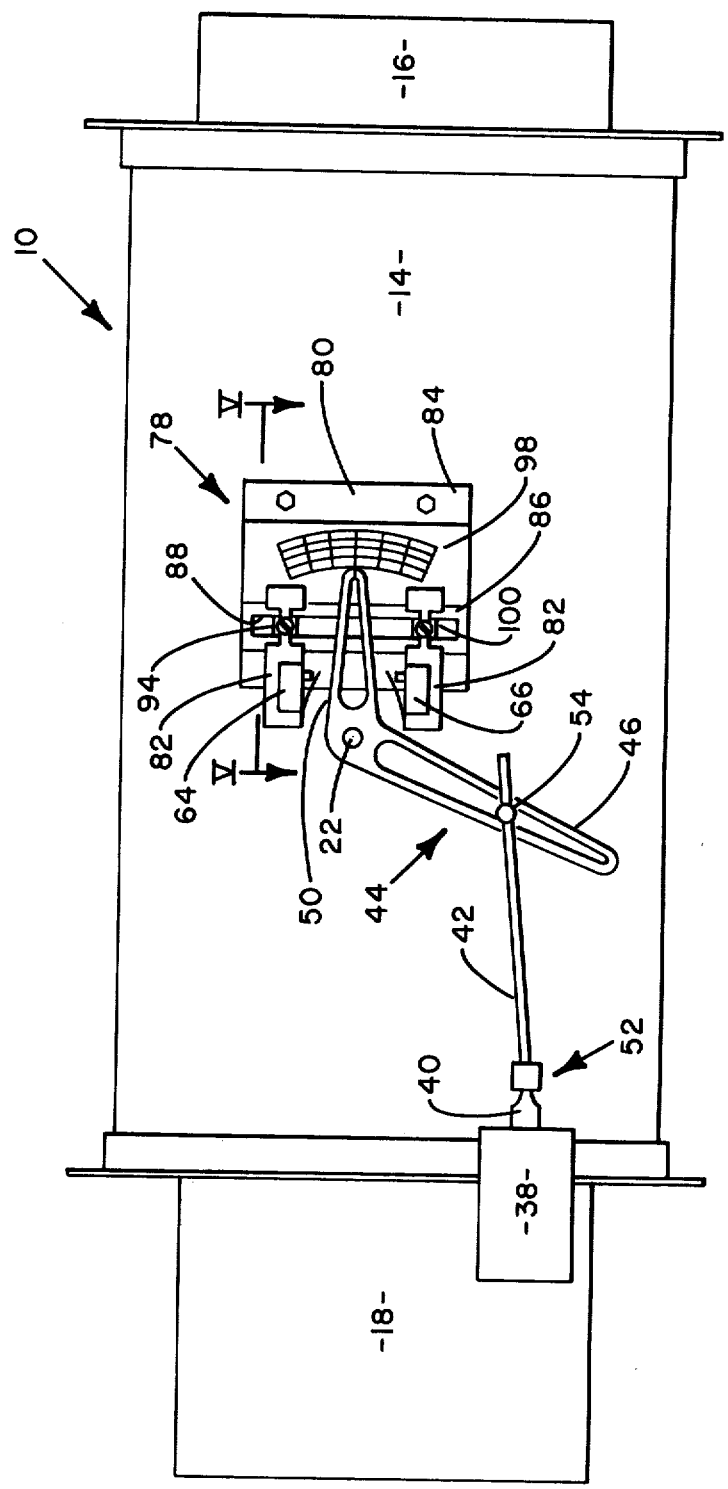
FIG. 2 shows the exterior of the supply air duct of FIG. 1 with a control assembly employing teachings of the present invention secured thereto.

Assembly 12 is enclosed within casing or housing 14 which, in turn, is positioned between inlet or upstream duct 16 and outlet or downstream duct 18. Damper assembly 12 includes damper blade 20, shaft 22, and spaced cut off plates or seal members 24 and 26. Cutoff plates 24 and 26 are mounted within housing 14 and define opening 30 for the flow of conditioned air from upstream duct 16 to downstream duct 18. Shaft 22 is rotatably supported by housing 14, extends transverse to the direction of air flowing through the housing, and is vertically located at approximately the same height as the vertical center of opening 30. Damper blade 20 is mounted on shaft 22 for rotation therewith, and the damper blade comprises L-shaped member 32 having a relatively long leg or plate 34 and a relatively short, slightly curved leg or plate 36. The curved face of plate 36 confronts the flow of air through opening 30, and the quantity of air flowing through opening 30 can be varied by moving plate 36 relative thereto. Referring to FIGS. 1 and 2, one end of damper shaft 22 is disposed outside casing 14, and electric motor 38 is connected to this end of the damper shaft to rotate the damper shaft and damper blade 20, thereby moving plate 36 across opening 30. More particularly, motor shaft 40 of motor 38 is connected to damper shaft 22 via connecting rod 42 and lever 44. Lever 44 comprises first and second legs 46 and 50, and the lever is secured to damper shaft 22 for unitary rotation therewith. One end of connecting rod 42 is pivotally secured to motor shaft 40 via pivot link 52, and a second end of the connecting rod is pivotally connected to leg 46 of lever 44 by pin 54. Motor 38 may be secured to casing 14 either directly or, as is often done, indirectly via a mounting plate (not shown) having prepunched mounting holes for the motor.

Figure 3:
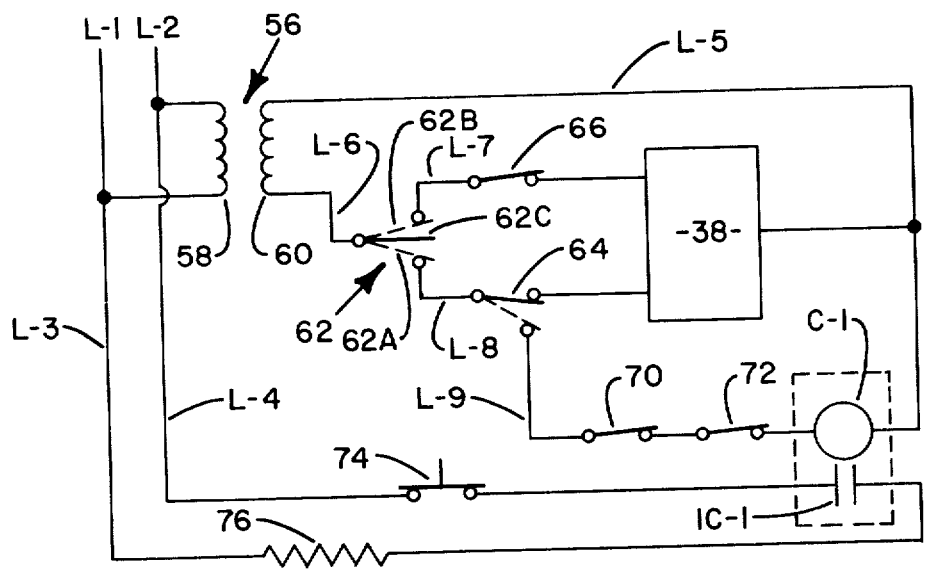
FIG. 3 is a schematic representation of an electric circuit for the control assembly shown in FIG. 2.

FIG. 3 is a schematic representation of an electric circuit connecting motor 38 to a source of electrical energy, represented in FIG. 3 by lines L-1 and L-2. As will be apparent to one skilled in the art, the circuit shown in FIG. 3 may be used with numerous types of sources of electrical energy. One suitable type, for example, provides an alternating current of approximately 115 volts with a frequency of about 60 Hertz. The circuit illustrated in FIG. 3 includes lines L-3, L-4, L-5, and L-6, and branch lines L-7, L-8, and L-9. Lines L-3 and L-4 are connected to lines L-1 and L-2, and lines L-5 and L-6 are connected to lines L-3 and L-4 via transformer 56. Transformer 56, having primary winding 58 and secondary winding 60, is employed to provide a stepped-down voltage of approximately 24 volts in lines L-5 through L-9. The circuit depicted in FIG. 3 further includes thermostatic switch 62, normally closed limit switches 64 and 66, normally closed safety switches 70 and 72, relay coil C-1, normally open relay contacts 1C-1 associated with coil C-1, normally closed manual cutout switch 74, and electric resistance heater 76.

Figure 4:
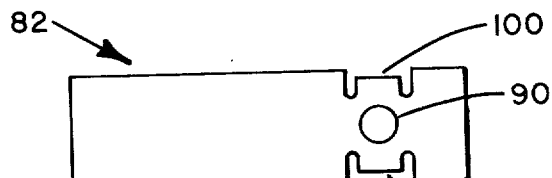
FIGS. 4 and 5 are, respectively, front and top views of the adjustable brackets shown in FIG. 2.
Figure 5:
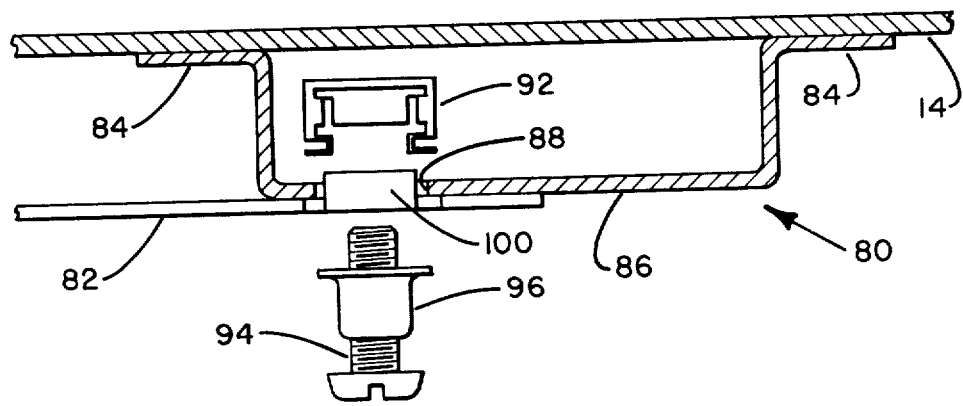

Referring back to FIG. 2, securing means 78 is provided to adjustably secure limit switches 64 and 66 to casing 14. More specifically, as shown in the preferred arrangement of FIG. 2, stationary bracket 80 is fixed to casing 14. A pair of adjustable brackets 82 (an adjustable bracket is shown in greater detail in FIGS. 4 and 5) are adjustably mounted on the stationary bracket, and limit switches 64 and 66 are secured to the adjustable brackets. Even more specifically, stationary bracket 80 includes spaced, coplanar surfaces 84 and planar surface 86. Surface 86 extends between surfaces 84, and the plane of surface 86 is parallel to but spaced from the plane of surfaces 84. Bracket 80 is fixed to casing 14 by securing surfaces 84 adjacent thereto by means such as screws. With this arrangement, surface 86 of bracket 80 is spaced from casing 14. Surface 86 of bracket 80 defines longitudinal slot or groove 88, and each movable bracket 82 defines an opening 90 (shown only in FIG. 4). Movable bracket 82 is mounted on stationary bracket 80 by positioning means such as cage nut 92 (shown only in FIG. 5) within slot 88 in pressure contact with the surfaces defining the slot, positioning opening 90 of bracket 82 over the cage nut and the slot, and inserting threaded screw 94 through opening 90, slot 88, and the threaded opening of nut 92. Screw 94 and nut 92 are then tightened together, tightly wedging bracket 82 together between the nut and the head of the screw. Collar or ferrule 96 may be positioned between the head of screw 94 and adjustable bracket 82 to facilitate wedging the adjustable bracket between nut 92 and the head of the screw.

Supply air ducts of the general type described above are commonly employed to transmit conditioned air from a central source thereof (not shown) to a room or rooms of a multi-room structure. Thermostatic switch 62 is responsive to the temperature of the air in the enclosure or zone served by duct 10 to vary the amount of air delivered to the enclosure in response to the temperature thereof. As the temperature of the air in the enclosure falls below a first predetermined level or set point, indicating a reduced need for cool air in the enclosure, thermostatic switch 62 moves to first or closing position 62A of FIG. 3. Electric current passes through line L-6, switch 62, line L-8, normally closed limit switch 64, and motor 38, causing the electric motor to extend motor shaft 40. Movement of motor shaft 40 is transmitted to lever 44 by connecting rod 42, causing the lever and damper shaft 22 to pivot about the axis of the damper shaft. Damper blade 20 rotates counterclockwise, and face 36 of the damper blade moves upward, toward top cutoff plate 24, reducing the flow of conditioned air through opening 30.

Conversely, as the temperature of the air in the enclosure served by duct 10 rises above a second predetermined level or set point, indicating an increased need for cool air in the enclosure, thermostatic switch 62 moves to second or opening position 62B of FIG. 3. Electric current passes through line L-6, switch 62, line L-7, normally closed limit switch 66, and motor 38, causing the electric motor to retract motor shaft 40. Lever 44 and damper 22 pivot clockwise about the axis of the damper shaft, causing damper blade 20 to rotate clockwise. Face 36 of damper blade 20 moves downward, away from top cutoff plate 24, increasing the flow of conditioned air through opening 30. Preferably, when the temperature of the enclosure served by duct 10 is above the first set point and below the second set point, indicating that the quantity of air delivered through duct 10 is satisfactory to maintain the temperature of the enclosure within a desired range, thermostatic switch 62 is in a third or neutral position 62C. Motor 38 is disconnected from the source of electrical energy, and damper blade 20 is maintained stationary.

As may be appreciated from a review of the above, the position of lever 44 is a function of the position of damper blade 20; and the lever, specifically leg 50 thereof, may be used for indicating the position of the damper blade. Indicia means such as chart or graph 98 may be provided on the outside of casing 14 so that the position of damper blade 20 can easily and accurately be determined by comparing the position of markings on leg 50 to the position of fixed markings on the chart. Commonly, leg 50 and chart 98 cooperate to indicate the percentage of maximum air flow capacity through duct 10 allowed by blade 20 as the damper blade moves across opening 30.

As indicated earlier, when thermostatic switch 62 is in position 62A for rotating damper blade 20 counterclockwise to restrict the flow of air through opening 30, lever 44 also pivots about the axis of damper shaft 22, and specifically leg 50 of the lever pivots upwards towards switch 64. Continued upward movement of leg 50 brings the leg into abutting contact with switch 64 and cause the leg to open or actuate switch 64. Motor 38 is disconnected from the source of electrical energy and prevented from further closing damper blade 20, irrespective of the position of thermostatic switch 62. Thus, switch 64 prevents motor 38 from closing damper blade 20 beyond a minimum air flow position. Similarly, when thermostatic switch 62 is in position 62B for rotating damper blade 20 clockwise to increase the flow of air through opening 30, lever 44 also pivots about the axis of damper shaft 22, and leg 50 is pivoted downward towards switch 66. Continued downward movement of leg 50 brings the leg into abutting contact with switch 66 and causes the leg to open or actuate switch 66. Electrical motor 38 is disconnected from the source of electrical energy and prevented from further opening damper blade 20, regardless of the position of thermostatic switch 62. Thus, switch 66 prevents motor 38 from opening damper blade 20 beyond a maximum air flow position.

Since each bracket 82 may easily be repositioned by loosening screw 94 and nut 92, moving the screw, nut, and bracket to a new position, and then retightening the nut and screw, the position of limit switches 64 and 66 can easily be changed, changing the minimum and maximum air flow positions of damper blade 20. Thus, with the present invention, supply duct 10 can satisfactorily serve any one of a number of different rooms or enclosures. Preferably, movable brackets 82 include flanges 100, best seen in FIGS. 4 and 5, adjacent to openings 90, with the flanges extending through slot 88 toward casing 14 when the movable brackets are mounted on stationary bracket 80. Flanges 100 cooperate with the portions of surface 86 that define slot 88 to facilitate positioning and to guide movement of movable brackets 82 relative to stationary bracket 80.

As may be understood from the above discussion, when damper blade 20 is in its minimum air flow position, cool air may be passing into the enclosure served by duct 10 even though the temperature of the enclosure is relatively low. For this reason, preferably, electric resistance heater 76 is located in duct 10 in heat transfer relation with the air passing therethrough; and, when limit switch 64 is opened in response to damper blade 20 reaching its mimimun air flow position, limit switch 64 is moved to the position shown in broken lines in FIG. 3. Line L-9 is connected to line L-8 and current flows through line L-6, thermostatic switch 62, line L-8, limit switch 64, line L-9, safety switches 70 and 72, and relay coil C-1. Coil C-1 is energized, closing the associated relay contacts 1C-1 in line L-4 and connecting heater 76 to the source of electrical energy. Heater 76 produces heat, and this heat is transferred to the air passing through duct 10 and into the enclosure served thereby, warming the enclosure toward a more desirable temperature. Switches 70 and 72 are safety devices which automatically disconnect heater 76 from the electrical energy source upon the development of undesirable conditions, for example very low air flow rates through duct 10 or excessively high temperatures therein. Other safety devices are well know in the art and may be added to the circuit shown in FIG. 3.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A control for a supply air duct having a damper blade for regulating a flow of conditioned air through the supply air duct and an electric motor for moving the damper blade between minimum and maximum air flow positions, the control comprising;

thermostatic switch means for selectively connecting the electric motor to a source of electrical energy in response to changes in a sensed temperature;

maximum flow switch means disposed outside the supply air duct for disconnecting the electric motor from the source of electrical energy when the damper blade reaches the maximum air flow position;

minimum flow switch means disposed outside the supply air duct for disconnecting the electric motor from the source of electrical energy when the damper blade reaches the minimum air flow position;

indicator means located outside the supply air duct and supported thereby for movement in response to movement of the damper blade for indicating the position thereof, the indicator means actuating the maximum flow switch means to disconnect the electric motor from the source of electrical energy when the damper blade reaches the maximum air flow position, and actuating the minimum flow switch means to disconnect the electric motor from the source of electrical energy when the damper blade reaches the minimum air flow position;

stationary bracket means located outside the supply air duct, fixed thereto, and including a surface spaced from the supply air duct and defining a groove;

first and second adjustable bracket means, wherein each adjustable bracket means includes means defining an opening positioned over the groove, and the minimum and maximum flow switch means are respectively secured to the first and second adjustable bracket means; and means extending through the openings defined by the adjustable bracket means and the groove defined by the stationary bracket means to adjustably secure the adjustable bracket means and the minimum and maximum flow switch means to the stationary bracket means, the position of the maximum and minimum flow switch means being adjustable to vary the maximum and minimum air flow positions of the damper blade.

2. A control as defined by claim 1 wherein:

the minimum and maximum flow switch means are located beside opposite sides of the indicator means;

the indicator means moves between the minimum and maximum flow switch means to actuate selectively one of the flow switch means; and each adjustable bracket means further includes a flange adjacent to the opening and extending into the groove to guide movement of the adjustable bracket means and the switch means secured thereto toward and away from the opposed switch means.

3. A control as defined by claim 2 wherein:

the indicator means is pivotally connected to the supply air duct, extends in a generally longitudinal direction between the maximum and minimum flow switch means, and pivots in a generally transverse direction therebetween; and the flange means limit movement of the maximum and minimum flow switch means in the generally longitudinal direction.

4. A control as defined by claim 3 for use with a supply air duct of the type having electric heater means disposed therein for heating air passing therethrough and wherein actuation of the minimum flow switch means connects the heater with the source of electrical energy to heat air passing through the supply air duct.

5. A control as defined by claim 4 wherein:

the thermostatic switch means includes an opening position for connecting the electric motor with the source of electrical energy to move the damper blade to increase the quantity of air flowing through the supply air duct, a closing position for connecting the electric motor with the source of electrical energy to move the damper blade to decrease the quantity of air flowing through the supply air duct, and a neutral position for disconnecting the electric motor from the source of electrical energy; and the thermostatic switch means is in the opening position when the sensed temperature is above a first predetermined value, the closing position when the sensed temperature is below a second predetermined value, less than the first predetermined value, and the neutral position when the sensed temperature is between the first and second predetermined values.

* * * * *